(12) United States Patent
Shih et al.

(10) Patent No.: US 7,782,250 B2
(45) Date of Patent: Aug. 24, 2010

(54) MILLIMETER WAVE RADAR TARGET SIMULATION SYSTEMS AND METHODS

(75) Inventors: Yi-Chi Shih, Palos Verdes Estates, CA (US); Kiet Mai, Pasadena, CA (US); Long Bui, Palos Verdes Estates, CA (US); Cam Bui, Redondo Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 151 days.

(21) Appl. No.: 12/138,715

(22) Filed: Jun. 13, 2008

(65) Prior Publication Data

US 2009/0309783 A1    Dec. 17, 2009

(51) Int. Cl.
*G01S 7/40*    (2006.01)
(52) U.S. Cl. .................. 342/172; 342/165; 342/169; 342/170
(58) Field of Classification Search .......... 342/165–175
See application file for complete search history.

(56) References Cited

U.S. PATENT DOCUMENTS

| | | | | |
|---|---|---|---|---|
| 4,467,327 A | * | 8/1984 | Drake et al. | 342/172 |
| 4,903,029 A | * | 2/1990 | Newberg et al. | 342/172 |
| 5,047,782 A | * | 9/1991 | Lew et al. | 342/169 |
| 5,117,230 A | * | 5/1992 | Wedel, Jr. | 342/169 |
| 5,177,488 A | * | 1/1993 | Wang et al. | 342/167 |
| 5,181,036 A | * | 1/1993 | Miler et al. | 342/15 |
| 5,262,786 A | * | 11/1993 | Cross | 342/167 |
| 5,518,400 A | * | 5/1996 | Otoide et al. | 434/4 |
| 5,892,479 A | * | 4/1999 | Mills et al. | 342/172 |
| 6,346,909 B1 | * | 2/2002 | Johnson et al. | 342/169 |
| 6,700,531 B2 | * | 3/2004 | Abou-Jaoude et al. | 342/165 |
| 6,710,737 B1 | * | 3/2004 | Cronyn | 342/174 |
| 6,950,057 B1 | * | 9/2005 | Mussell et al. | 342/170 |
| 7,154,431 B2 | * | 12/2006 | Pace et al. | 342/15 |
| 7,592,943 B2 | * | 9/2009 | Beasley | 342/27 |

* cited by examiner

*Primary Examiner*—Thomas H Tarcza
*Assistant Examiner*—Peter M Bythrow
(74) *Attorney, Agent, or Firm*—Black Lowe & Graham PLLC

(57) ABSTRACT

A millimeter wave radar target simulation system and method. The system includes a down-converter that converts a millimeter wave radar signal to an intermediate frequency, an electrical-to-optical modulator that modulates an optical signal based on the down-converted signal, an optical-to-electrical demodulator that demodulates an optical signal to an electrical signal, an optical delay line serving to delay a signal passing from the electrical-to-optical modulator to the optical-to-electrical demodulator, and an up-converter that converts the electrical signal from the optical-to-electrical demodulator to a frequency that simulates a millimeter wave target return. The method includes receiving a millimeter wave radar signal, down-converting the radar signal to an intermediate frequency, modulating the down-converted signal to an optical signal, delaying the optical signal, demodulating the delayed optical signal, and up-converting the demodulated signal to a signal having a frequency that simulates a millimeter wave radar target return.

18 Claims, 3 Drawing Sheets

MILLIMETER WAVE RADAR TARGET SIMULATION SYSTEMS AND METHODS

BACKGROUND OF THE INVENTION

Current radar testing equipment typically requires an outdoor target range and tower that prohibits adjustment of radar parameters during testing. Current systems also generally use non-integrated optical modulators and demodulators which results in increased system complexity and cost. Current systems typically have an optical delay line that provides for only one fixed time delay that simulates a single target return. This does not adequately address testing scenarios that include multiple targets.

SUMMARY OF THE INVENTION

The present invention provides millimeter wave radar target simulation systems and methods. In an example embodiment, the system includes a down-converter that receives a millimeter wave radar signal and converts the radar signal to a down-converted signal having an intermediate frequency. The system additionally includes an electrical-to-optical modulator in signal communication with the down-converter, the electrical-to-optical modulator modulates an optical signal based on the down-converted signal. The system also includes an optical-to-electrical demodulator that demodulates an optical signal to an electrical signal and an optical delay line in signal communication with the electrical-to-optical modulator and the optical-to-electrical demodulator, the optical delay line serving to delay a signal passing from the electrical-to-optical modulator to the optical-to-electrical demodulator. An up-converter is in signal communication with the optical-to-electrical demodulator and converts electrical signals from the optical-to-electrical demodulator from an intermediate frequency to a signal having a frequency that simulates a millimeter wave radar target return.

In accordance with further aspects of the invention, the system includes a first coupler situated between the down-converter and the electrical-to-optical modulator and a second coupler situated between the optical-to-electrical converter and the up-converter, the second coupler in signal communication with the first coupler. The second coupler directs a portion of the electrical output signal from the optical-to-electrical demodulator to the first coupler and also allows the signal from the optical-to-electrical demodulator to pass through to the up-converter. The first coupler allows both the down-converted signal from the down-converter and the signal from the second coupler to pass to the electrical-to-optical modulator.

In accordance with other aspects of the invention, the method includes receiving a millimeter wave radar signal, down-converting the received millimeter wave radar signal to a down-converted signal having an intermediate frequency, modulating the down-converted signal to an optical signal, delaying the optical signal, demodulating the delayed optical signal, and up-converting the demodulated signal to a signal having a frequency that simulates a millimeter wave radar target return.

In accordance with still further aspects of the invention, the method includes receiving a millimeter wave radar signal, down-converting the received millimeter wave radar signal to a down-converted signal having an intermediate frequency, modulating the down-converted signal to an optical signal, delaying the optical signal, demodulating the delayed optical signal, and up-converting the demodulated signal to a signal having a frequency that simulates a millimeter wave radar target return.

As will be readily appreciated from the foregoing summary, the invention provides a millimeter wave radar target simulation system and method.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
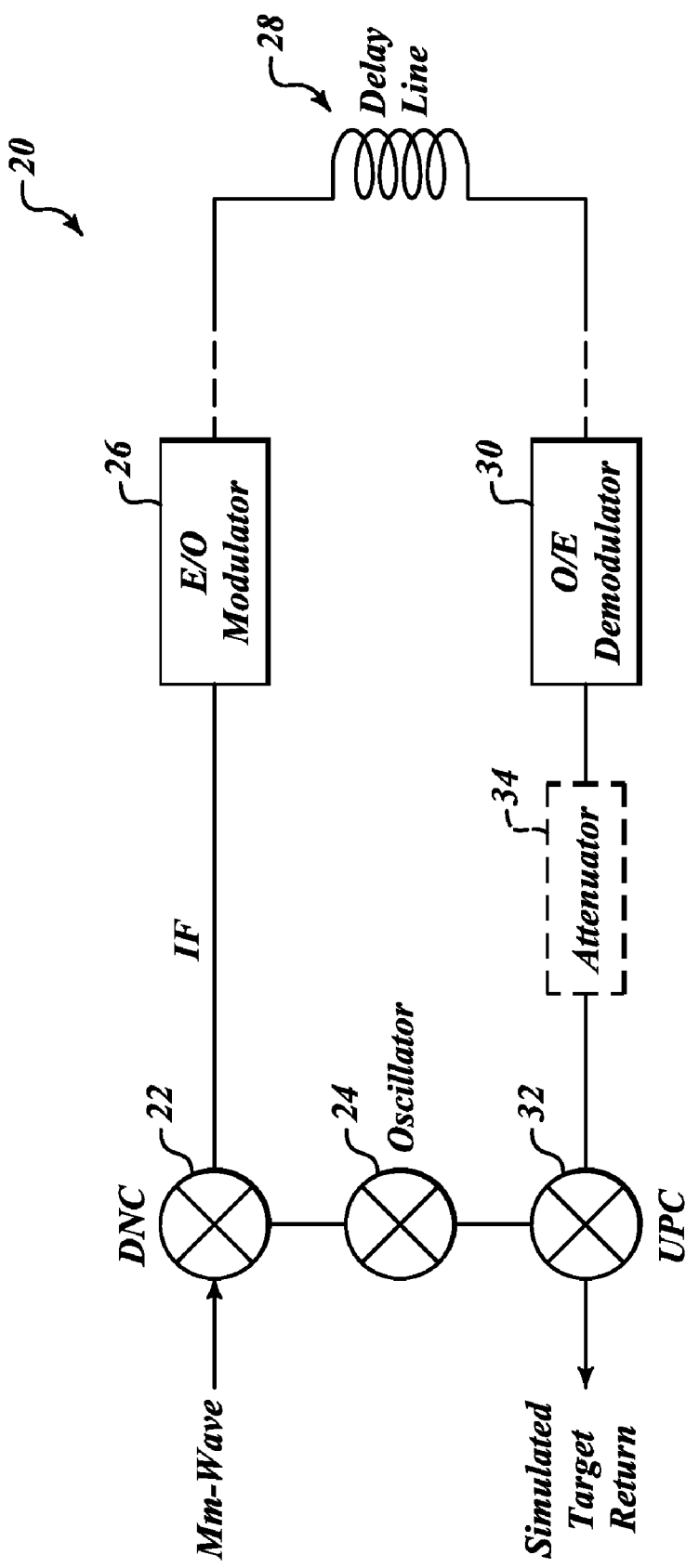
FIG. 1 is a diagram of a millimeter wave radar target simulation system formed in accordance with an embodiment of the invention.

FIG. 1 is a diagram of a millimeter wave radar target simulation system 20 formed in accordance with an embodiment of the invention. The millimeter wave radar target simulation system 20 provides improved simulation of radar return signals.

The radar target simulation system 20 includes a down-converter (DNC) 22 driven by an oscillator 24. The down-converter 22 receives a millimeter wave signal and converts the millimeter wave signal to a signal at an intermediate frequency (IF). Typically, the DNC 22 receives a signal in the millimeter wave range from 30 GHz to 300 GHz, with system bandwidth generally being no wider than approximately 3 GHz. Specific frequency bands centered at 35 GHz, 77 GHz, 94 GHz, and 140 GHz, for example may be used for radar simulation applications. In an example embodiment, the IF is typically within a range of 1 to 10 gigahertz (GHz). An electrical-to-optical (E/O) modulator 26 is in signal communication with the DNC 22. The E/O modulator 26 receives the IF signal from the DNC 22 and modulates an optical carrier signal based on the down-converted IF signal. Preferably, the E/O modulator 26 also generates and transmits the optical carrier signal. The modulated optical signal passes through an optical delay line 28, such as an optical fiber, that is in signal communication with the E/O modulator 26 before being received by an optical-to-electrical (O/E) demodulator 30. The optical delay line 28 serves to delay the modulated optical signal from the E/O modulator 26 before it is demodulated by the O/E demodulator 30. Generally, the delay time is proportional to the length of the optical delay line 28. The O/E demodulator 30 demodulates the optical signal to an electrical signal having an intermediate frequency. The demodulated signal from the O/E demodulator 30 then passes to an up-converter (UPC) 32 that is driven by the oscillator 24. The UPC 32 converts the electrical signal from the O/E demodulator 30 to a signal having a frequency that simulates a millimeter wave radar target return. In an example embodiment, the target return signals are replicas of the millimeter wave signal received at the DNC 22, but delayed in time and in some cases also being attenuated as compared to the received signal.

Figure 3:
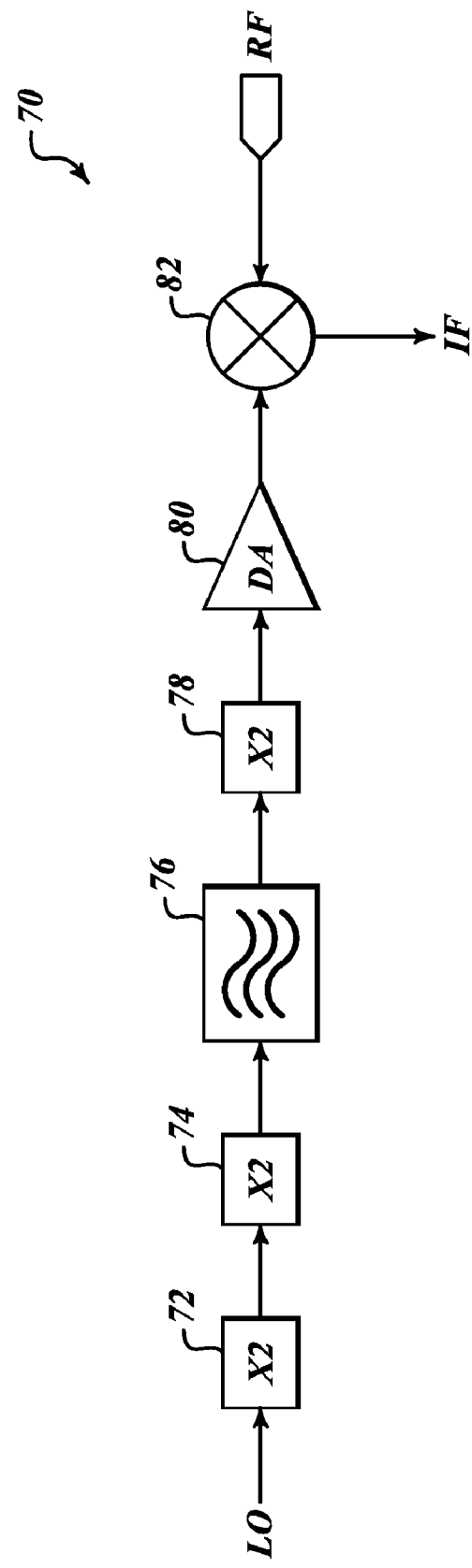
FIG. 3 is a diagram of an integrated conversion component that may be used as an up-converter or down-converter in the systems shown in FIGS. 1 and 2.

In an example embodiment, the DNC 22 and the UPC 32 are integrated conversion components such as the conversion component described with respect to FIG. 3. In some embodiments, the oscillator 24 is a coherent oscillator and the DNC 22 and UPC 32 perform down and up-conversions respectively in a coherent manner. In some embodiments, an attenuator 34 may also be used so that radar targets having different cross-sections may be simulated. The attenuator 34 may be a controllable variable attenuator located between the O/E demodulator 30 and the UPC 32, for example. A controller (not shown) that may include a programmable processor, for example, may also be present in some embodiments so that the oscillator 24 and/or the attenuator 34 may be selectively controlled.

Figure 2:
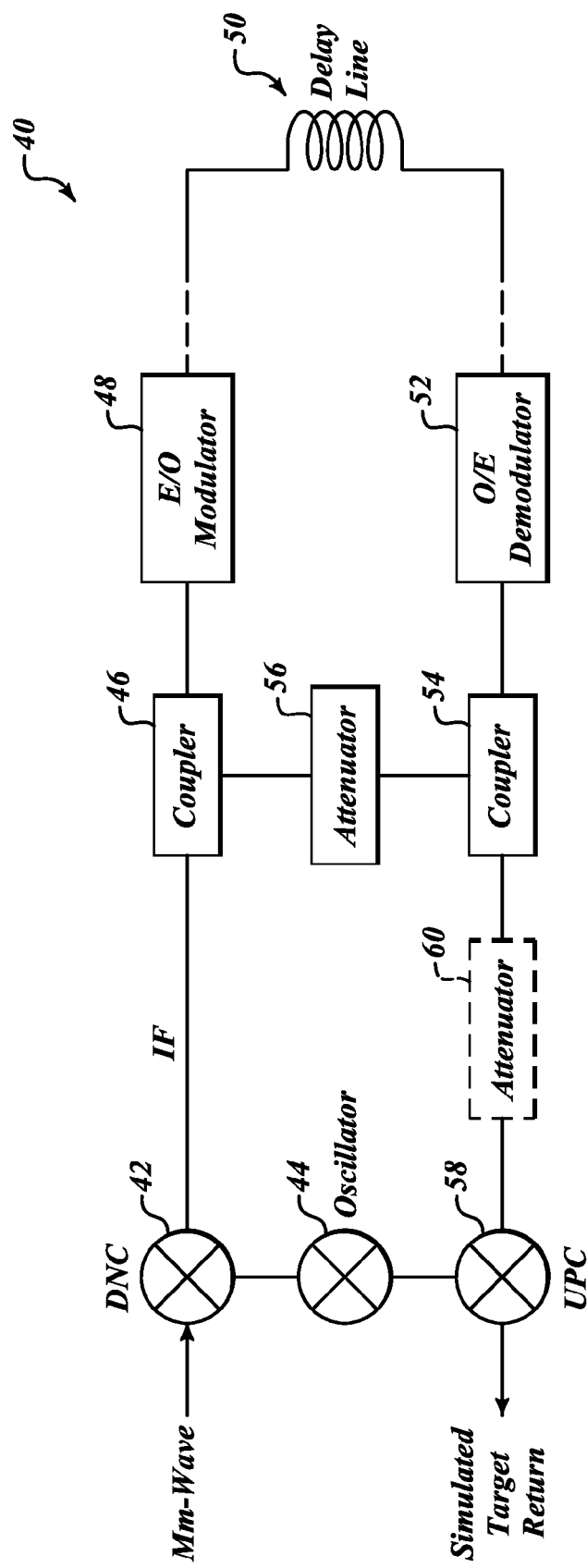
FIG. 2 is a diagram of a millimeter wave radar target simulation system including couplers formed in accordance with an embodiment of the invention.

FIG. 2 is a diagram of a millimeter wave radar target simulation system 40 formed in accordance with an embodiment of the invention. The radar target simulation system 40 includes a DNC 42 driven by an oscillator 44. The DNC 42 receives a millimeter wave signal and converts the millimeter wave signal to a signal at an IF. In an example embodiment, the IF is typically within a range of 1 to 10 GHz. A first coupler 46 is in signal communication with the DNC 42. The first coupler 46 passes the IF signals from the DNC 42 and combines them with additional signals entering the first coupler 46 if any additional signals are present. An E/O modulator 48 is in signal communication with the first coupler 46. The E/O modulator 48 receives the signals from the first coupler 46 and modulates an optical carrier signal based on the signals received from the first coupler 46. The modulated optical signal passes through an optical delay line 50 that is in signal communication with the E/O modulator 48 before being received by an O/E demodulator 52. The optical delay line 50 serves to delay the modulated optical signal from the E/O modulator 48 before it is demodulated by the O/E demodulator 52.

The O/E demodulator 52 demodulates the optical signal to an electrical signal having an intermediate frequency. The demodulated signal from the O/E demodulator 52 then passes to a second coupler 54 that is in signal communication with the O/E demodulator 52. The second coupler 54 splits the electrical signals from the O/E demodulator 52 into two signal paths. A first signal path from the second coupler 54 passes to the first coupler 46. In an example embodiment, the first path first passes through an attenuator 56 before reaching the first coupler 46. The attenuator 56 is in signal communication with both the first coupler 46 and the second coupler 54. The attenuator 56 attenuates the signal in the first path from the second coupler 54 before it reaches the first coupler 46. The attenuator 56 is a variable attenuator in an example embodiment that may be adjusted to set a desired simulated target cross-section, but may also have fixed attenuation characteristics in other embodiments. A second signal path from the second coupler 54 passes to a UPC 58 that is driven by the oscillator 44. The first coupler 46 and second coupler 54 may be connected to the other components in a conventional manner, such as by using coaxial cable, for example. The upconverter 58 converts the electrical signal from the second coupler 54 to a signal having a frequency that simulates a millimeter wave radar target return. In an example embodiment, the signal strength passed to each of the two signal paths from the second coupler 54 is equal. However, in other embodiments, the signal strength passed to the first signal path is not equal to the signal strength passed to the second signal path. Rather, the second coupler 54 splits the electrical signals from the O/E demodulator 52 into the first and second signal paths based on a predetermined ratio of first path signal strength to second path signal strength.

Splitting the signal from the O/E demodulator 52 generates a signal that circulates through the delay line 50, with each pass of the signal becoming more attenuated from passing through the attenuator 56. The multiple passes through the delay line 50 allow simulation of multiple target returns with delay times and corresponding simulated target distances that are integer multiples of a length of the delay line 50. The return signals are eventually attenuated below a noise threshold after passing through the attenuator 56 multiple times. In an example embodiment, the second coupler 54, attenuator 56, and first coupler 46 sample the signal from the O/E demodulator 52 and inject the sampled signal back to an input side of the E/O modulator 48.

In an example embodiment, the DNC 42 and the UPC 58 are integrated conversion components such as the conversion component described with respect to FIG. 3. In some embodiments, the oscillator 44 is a coherent oscillator and the DNC 42 and UPC 58 perform down and up-conversions respectively in a coherent manner. In some embodiments, an additional attenuator 60 may also be used so that radar targets having different cross-sections may be simulated. The additional attenuator 60 may be a controllable variable attenuator located between the second coupler 54 and the UPC 58, for example. A controller (not shown) that may include a programmable processor, for example, may also be present in some embodiments so that the oscillator 44, the attenuator 56, and/or the additional attenuator 60 may be selectively controlled.

The millimeter wave target simulation systems 20 and 40 may be used in a lab bench situation with direct connections between a radar system under test and the DNC 22, 42 and UPC 32, 58 such as by using probes (not shown) in signal communication with the DNC 22, 42 and UPC 32, 58 that are also in signal communication with a signal generation and signal reception component respectively of the radar system under test, for example. The systems 20 and 40 may also be integrated into radar systems as built-in test equipment (BITE) systems. The systems 20 and 40 may also be used in outdoor field testing of a radar system. In outdoor field testing, the DNC 22, 42 and UPC 32, 58 may be connected to standard gain horn antennas (not shown) or other types of antennas, for example so that the systems 20, 40 can receive and transmit signals to and from the radar system. In an example embodiment, the systems 20, 40 are positioned a distance that is a multiple of approximately ten times the size of the horn antenna used, such as by using a one foot antenna and a separation distance of ten feet, for example.

FIG. 3 is a diagram of an integrated conversion component 70 that may be used as the UPC 32, 58 or the DNC 22, 42 in the systems shown in FIGS. 1 and 2 respectively. The conversion component 70 includes a first doubling multiplier 72. In an example embodiment, the first doubling multiplier 72 receives a local oscillator (LO) signal such as a signal received from the oscillator 24 or the oscillator 44 and multiplies the oscillator signal by a factor of two to produce a 2X signal. A second doubling multiplier 74 is in signal communication with the first doubling multiplier 72 and multiplies the 2X signal output of the first doubling multiplier 72 by a factor of two to produce a 4X signal. A filter 76 is in signal communication with the second doubling multiplier 74 and filters the 4X output of the second doubling multiplier to generate a filtered 4X signal. In an example embodiment, the filter 76 is configured to remove harmonics and spurious signals from the first doubling multiplier 72 and the second doubling multiplier 74 so that the harmonics and spurious signals will not be regenerated in the conversion component 70. A third doubling multiplier 78 is in signal communication with the filter 76 and multiplies the filtered 4X signal to produce an 8X signal. A driver amplifier 80 includes an input in signal communication with the third doubling multiplier 78 and an output in signal communication with a mixer 82. The driver amplifier 80 drives the mixer 82. The mixer 82 includes a radio-frequency (RF) connection and an intermediate frequency (IF) connection.

The conversion component 70 may function as a down-converter or an up-converter. When the conversion component 70 operates as a down-converter, an RF signal is received at the mixer 82 and down-converted to an IF signal. The directions of the arrows entering and leaving the mixer 82 indicate this functionality. Although the arrows that connect the mixer 82 to IF and RF signals indicate down-conversion, up-conversion is also possible, in which case an IF signal is received at the mixer 82 and up-converted to an RF signal. Although the connecting arrows are not shown proceeding in this manner, it should be understood that such operation is possible with the conversion component 70. In an example embodiment, a millimeter wave RF signal from a radar system under test enters the mixer 82 when the conversion component 70 is operating as a DNC and the mixer 82 produces a millimeter wave RF signal containing simulated target return signals when the conversion component 70 is operating as a UPC.

A millimeter wave radar target simulation method in accordance with an example embodiment of the invention includes receiving a millimeter wave radar signal at a down-converter such as the DNC 22 or the DNC 42, for example. The method also includes down-converting the received millimeter wave radar signal to a down-converted signal having an intermediate frequency and modulating the down-converted signal to an optical signal at an electrical-to-optical modulator such as the E/O modulator 26 or 48, for example. The modulated optical signal is delayed using an optical delay line, such as the delay line 28 or 50 and then demodulated using an optical-to-electrical demodulator such as the O/E demodulator 30 or 52. The demodulated signal is then up-converted to a signal having a frequency that simulates a millimeter wave radar target return using an up-converter such as the UPC 32 or 58.

In an example embodiment, the down-converting and up-converting are performed using a DNC and a UPC that are driven by a single local oscillator such as the oscillator 24 or 44. The DNC and the UPC may each be a single integrated component such as the conversion component 70 described with respect to FIG. 3. Both down-converting and up-converting include multiplying and filtering a local oscillator signal to generate a multiplied and filtered oscillator signal and amplifying the multiplied and filtered local oscillator signal to generate an amplified signal. Down-converting includes mixing the amplified signal and a millimeter wave radar signal to generate the down-converted signal at the intermediate frequency while up-converting includes mixing the amplified signal and a signal having an intermediate frequency to generate the up-converted signal having a frequency that simulates a millimeter wave radar target return. In an exemplary embodiment, multiplying and filtering includes multiplying the local oscillator signal by a factor of two to generate a 2X signal, multiplying the 2X signal by a factor of 2 to generate a 4X signal, filtering the 4X signal to generate a filtered 4X signal, and multiplying the filtered 4X signal to generate an 8X signal.

In an additional example embodiment, the method includes combining the down converted signal with an additional signal to produce a combined signal such as by using the first coupler 46. The combined signal rather than solely the down-converted signal is modulated to an optical signal such as by using the E/O modulator 48. The demodulated signal such as from the O/E demodulator 52 is split into a first signal path and a second signal path such as by using the second coupler 54. The first signal path includes the additional signal that is combined with the down-converted signal such as by using the first coupler 46 as described above. The second signal path is the demodulated signal that is up-converted such as by using the UPC 58 to a signal having a frequency that simulates a millimeter wave target return. In an exemplary embodiment, the method also includes attenuating signals in the second signal path before they are combined with the down-converted signal such as by using the attenuator 56.

While the preferred embodiment of the invention has been illustrated and described, as noted above, many changes can be made without departing from the spirit and scope of the invention. For example, although the multipliers and the filter of the conversion component 70 are shown and described in a particular manner, other combinations and types of filters and multipliers may also be used for the DNC and UPC. Additionally, although the attenuator 56 is shown between the first coupler 46 and the second coupler 54 in FIG. 2, other embodiments may use configurations where couplers or other devices are used to recirculate a portion of a signal to simulate multiple target returns without an attenuator being present between the couplers. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A millimeter wave radar target simulation system comprising:
    a down-converter configured to receive a millimeter wave radar signal and convert the radar signal to a down-converted signal having an intermediate frequency;
    an electrical-to-optical modulator in signal communication with the down-converter, the electrical-to-optical modulator configured to modulate an optical signal based on the down-converted signal;
    an optical-to-electrical demodulator configured to demodulate the optical signal to an electrical signal having an intermediate frequency;
    an optical delay line in signal communication with the electrical-to-optical modulator and the optical-to-electrical demodulator, the optical delay line serving to delay a signal passing from the electrical-to-optical modulator to the optical-to-electrical demodulator;
    an up-converter in signal communication with the optical-to-electrical demodulator, the up-converter configured to convert the electrical signal from the optical-to-electrical demodulator to an up-converted signal having a frequency that simulates a millimeter wave radar target return;
    a first coupler situated between the down-converter and the electrical-to-optical modulator; and
    a second coupler situated between the optical-to-electrical demodulator and the up-converter, the second coupler in signal communication with the first coupler,
    wherein the second coupler is configured to direct a portion of the electrical output signal from the optical-to-electrical demodulator to the first coupler and also to allow the signal from the optical-to-electrical demodulator to pass through to the up-converter and wherein the first coupler is configured to allow both the down-converted signal from the down-converter and the signal from the second coupler to pass to the electrical-to-optical modulator.

2. The millimeter wave radar target simulation system of claim 1, further comprising a single oscillator for driving both the down-converter and the up-converter.

3. The millimeter wave radar target simulation system of claim 1, wherein the up-converter is a single integrated component and the down-converter is a single integrated component.

4. The millimeter wave radar target simulation system of claim 1, wherein the down-converter comprises:
 a multiplier and filter stage configured to multiply and filter a local oscillator signal;
 a driver amplifier stage configured to amplify the multiplied and filtered local oscillator signal; and
 a mixer configured to mix the amplified signal and the millimeter wave radar signal to produce the down-converted signal at the intermediate frequency.

5. The millimeter wave radar target simulation system of claim 4, wherein the multiplier and filter stage comprises:
 a first doubling multiplier configured to receive and multiply by 2 the local oscillator signal to generate a 2X signal;
 a second doubling multiplier configured to receive the 2X output of the first doubling multiplier and multiply it by 2 to generate a 4X signal;
 a filter configured to receive and filter the 4X output of the second doubling multiplier to generate a filtered 4X signal; and
 a third doubling multiplier configured to receive the filtered 4X signal from the filter and multiply it by 2 to generate an 8X signal.

6. The millimeter wave radar target simulation system of claim 1, wherein the up-converter comprises:
 a multiplier and filter stage configured to multiply and filter a local oscillator signal;
 a driver amplifier stage configured to amplify the multiplied and filtered local oscillator signal; and
 a mixer configured to mix the amplified signal and a signal having an intermediate frequency to produce the up-converted signal having a frequency that simulates a millimeter wave radar target return.

7. The millimeter wave radar target simulation system of claim 6, wherein the multiplier and filter stage comprises:
 a first doubling multiplier configured to receive and multiply by 2 the local oscillator signal to generate a 2X signal;
 a second doubling multiplier configured to receive the 2X output of the first doubling multiplier and multiply it by 2 to generate a 4X signal;
 a filter configured to receive and filter the 4X output of the second doubling multiplier to generate a filtered 4X signal; and
 a third doubling multiplier configured to receive the filtered 4X signal from the filter and multiply it by 2 to generate an 8X signal.

8. The millimeter wave radar target simulation system of claim 1, further comprising an attenuator situated between the first coupler and the second coupler.

9. The millimeter wave radar target simulation system of claim 8, wherein the attenuator is a variable attenuator.

10. The millimeter wave radar target simulation system of claim 1, wherein the up-converter is configured to convert the electrical signal from the optical-to-electrical demodulator to a signal that simulates a plurality of radar target returns at a plurality of distances, wherein the distances are based on at least a length of the optical delay line and a number of times a signal circulates through the first coupler, the electrical-to-optical modulator, the optical delay line, the optical-to-electrical demodulator, and the second coupler before entering the up-converter.

11. A millimeter wave radar target simulation method comprising:
 receiving a millimeter wave radar signal;
 down-converting the received millimeter wave radar signal to a down-converted signal having an intermediate frequency;
 combining the down-converted signal with an additional signal to produce a combined signal;
 modulating the combined signal to an optical signal;
 delaying the optical signal;
 demodulating the delayed optical signal;
 splitting the demodulated signal into a first signal path and a second signal path; and
 up-converting the demodulated signal to an up-converted signal having a frequency that simulates a millimeter wave radar target return,
 wherein the first signal path includes the additional signal that is combined with the down-converted signal and wherein the second signal path is the demodulated signal that is up-converted to a signal having a frequency that simulates a millimeter wave target return.

12. The millimeter wave radar target simulation method of claim 11, wherein down-converting and up-converting are performed using a single local oscillator.

13. The millimeter wave radar target simulation method of claim 11, wherein down-converting is performed using a single integrated component and wherein up-converting is performed using a single integrated component.

14. The millimeter wave radar target simulation method of claim 11, wherein down-converting comprises:
 multiplying and filtering a local oscillator signal to generate a multiplied and filtered local oscillator signal;
 amplifying the multiplied and filtered local oscillator signal to generate an amplified signal; and
 mixing the amplified signal and a millimeter wave radar signal to generate the down-converted signal at the intermediate frequency.

15. The millimeter wave radar target simulation method of claim 14, wherein multiplying and filtering comprises:
 multiplying the local oscillator signal by 2 to generate a 2X signal;
 multiplying the 2X signal by 2 to generate a 4X signal;
 filtering the 4X signal to generate a filtered 4X signal; and
 multiplying the filtered 4X signal to generate an 8X signal.

16. The millimeter wave radar target simulation method of claim 11, wherein up-converting comprises:
 multiplying and filtering a local oscillator signal to generate a multiplied and filtered local oscillator signal;
 amplifying the multiplied and filtered local oscillator signal to generate an amplified signal; and
 mixing the amplified signal and a signal having an intermediate frequency to generate the up-converted signal having a frequency that simulates a millimeter wave radar target return.

17. The millimeter wave radar target simulation method of claim 16, wherein multiplying and filtering comprises:
 multiplying the local oscillator signal by 2 to generate a 2X signal;
 multiplying the 2X signal by 2 to generate a 4X signal;
 filtering the 4X signal to generate a filtered 4X signal; and
 multiplying the filtered 4X signal to generate an 8X signal.

18. The millimeter wave radar target simulation method of claim 11, further comprising attenuating signals in the second signal path before they are combined with the down-converted signal.

* * * * *